United States Patent [19]

Di Vita

[11] 3,841,427
[45] Oct. 15, 1974

[54] VEHICLE COLLISION PREVENTION DEVICE

[76] Inventor: Vito Di Vita, 9609 N. 34th Ave., Phoenix, Ariz. 85021

[22] Filed: Nov. 19, 1973

[21] Appl. No.: 417,399

[52] U.S. Cl..................... 180/98, 340/53, 340/258
[51] Int. Cl.............................................. B60t 7/12
[58] Field of Search...... 180/98, 105 E, 105 R, 110; 343/7 R, 7.3; 340/104, 53, 31 R, 258 R, 158 A, 158 B

[56] References Cited
UNITED STATES PATENTS

| | | | |
|---|---|---|---|
| 2,699,834 | 1/1955 | O'Brien................................. | 180/98 |
| 3,442,347 | 5/1969 | Hodgson et al...................... | 180/98 |
| 3,448,822 | 6/1969 | LaLone et al. ...................... | 180/98 |
| 3,689,882 | 9/1972 | Dessailly.............................. | 180/98 |
| 3,749,197 | 7/1973 | Deutsch............................... | 180/98 |
| 3,789,950 | 2/1974 | Strenglein........................... | 180/98 |

FOREIGN PATENTS OR APPLICATIONS 1,555,384 10/1970 Germany .............................. 180/98

Primary Examiner—David Schonberg
Assistant Examiner—Jack D. Rubenstein

[57] ABSTRACT

A device intended for mounting in a vehicle to detect the distance to a vehicle traveling in front of the protected vehicle and adapted to automatically activate the protective vehicle braking system to maintain a distance from the front vehicle as preset by the vehicle driver to prevent colliding with the same, the device including a limited power radar unit for sensing the distance to the vehicle in front and providing a voltage output proportional with such distance, a tachometer generator for constantly indicating the speed of the protected vehicle, an integrator for receiving all input information and providing an output in proportion to the distance in a manner to either apply or release the vehicle brakes, and a dual acting hydraulic cylinder connected to the vehicle brake and operated in response to the integrator signals for the mechanical actuation of the vehicle brakes.

3 Claims, 4 Drawing Figures

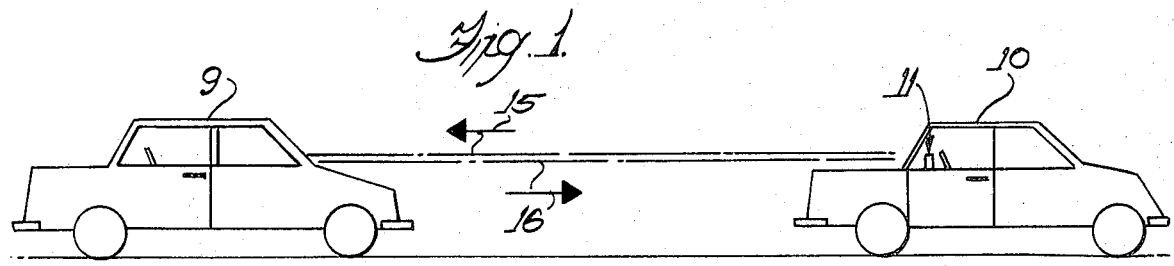
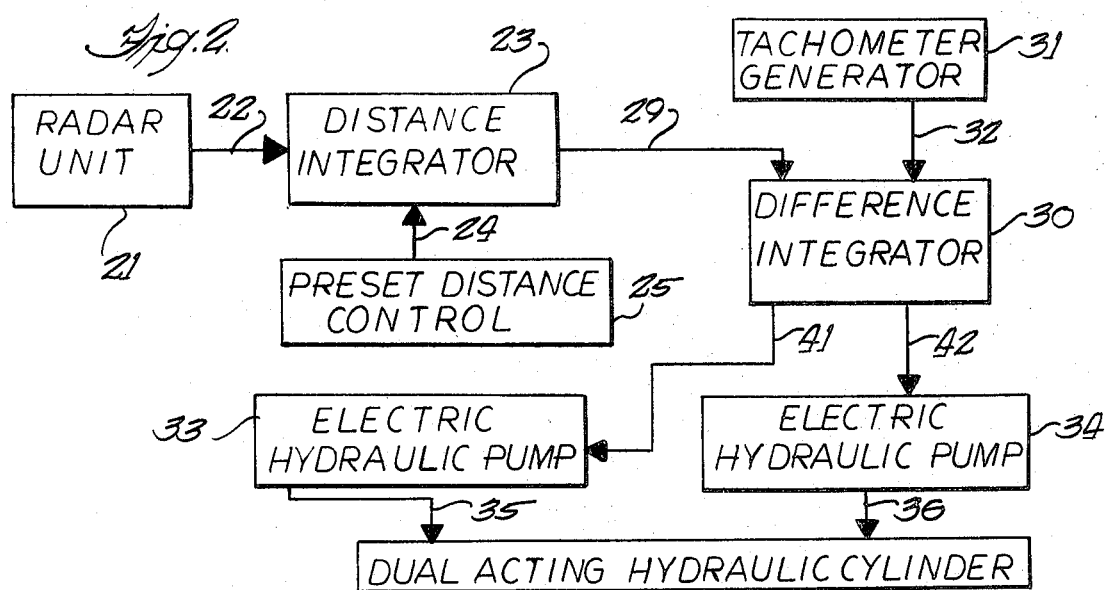
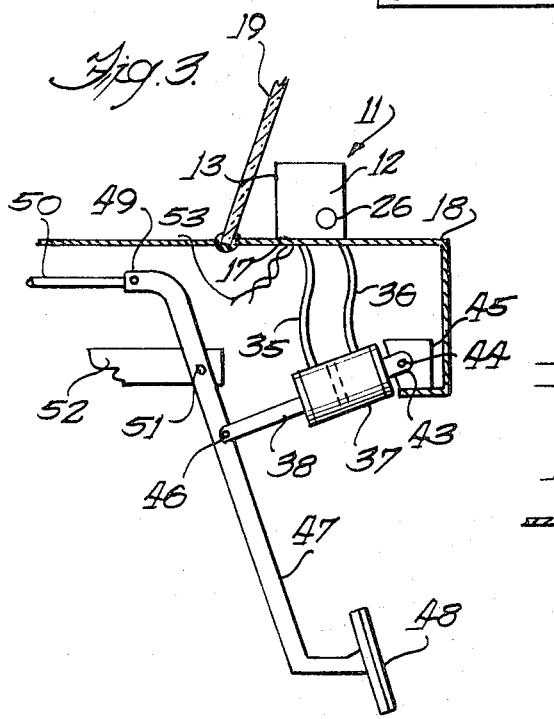
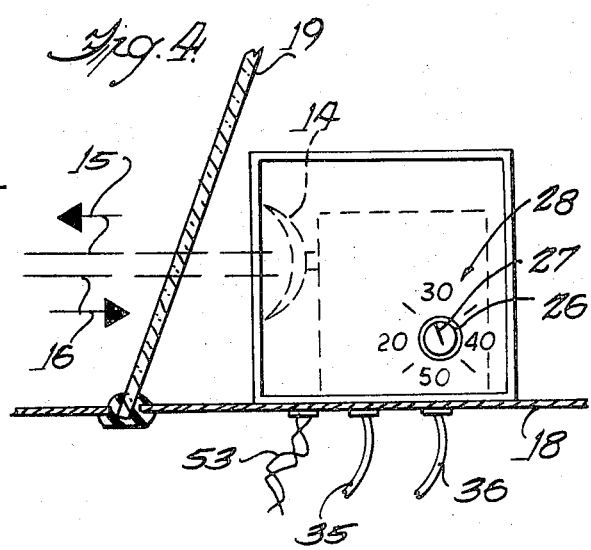

VEHICLE COLLISION PREVENTION DEVICE

BACKGROUND OF THE INVENTION

1. Field of the Invention

This invention relates generally to vehicles and more particularly to a novel vehicle collision prevention device intended for the mounting in a vehicle to detect the distance to the vehicle traveling immediately in front of such vehicle and operable in a manner to actuate the protected vehicle's brakes upon the reaching of a preset distance behind such front vehicle so as to automatically maintain the preset distance to avoid collision with the front vehicle.

DESCRIPTION OF THE PRIOR ART

Rear end collisions constitute a major part of accidents on streets and highways today, with these accidents normally being cause by the tail-gating driving habit of vehicle drivers. It has been found that such tail-gating, in many cases, is inadvertent on the part of the vehicle driver as the driver does not even know he is following too closely, this often occuring in heavy traffic flow where large numbers of cars are constantly changing their velocity in accordance with the traffic conditions. Such rear-end collisions often result in injury to the vehicle drivers, such as whiplash, along with damage to the vehicle.

Prior art devices have recognized this problem and have attempted to provide solutions thereto in a manner to control the distance between vehicles. However, such devices have met with one or more disadvantages making the same not suitable or not acceptable for use, such disadvantages being overly expensive to manufacture, high installation costs, complexity of mechanism, high level of repair and maintenance, difficult to properly operate, and the like.

SUMMARY OF THE INVENTION

The present invention recognizes the dangers of rear-end collisions along with recognizing the deficiencies and disadvantages of presently available devices intended to prevent such rear-end collisions, and provides a novel solution to the problem in the form of a vehicle collision prevention device including a radar type unit intended to be mounted on a vehicle dashboard or the like behind the vehicle windshield and having an unobstructed forward line of vision in a manner to send out radar waves to strike a front vehicle which the protected vehicle is following with such waves bouncing back to the radar unit in a manner to indicate the distance to the front vehicle, the radar unit including an integrator which is connected to the protected vehicle for indicating the speed of the same with the output of the integrator operating a dual acting hydraulic cylinder connected to the vehicle brake so as to slow or stop the protected vehicle if the distance between the front vehicle and the protected vehicle becomes less than the distance preset as desirable by the vehicle driver.

It is a feature of the present invention to provide a vehicle collision prevention device intended for maintaining a desired preset distance between a front vehicle and the following vehicle.

A further feature of the present invention provides a vehicle collision prevention device for detecting the distance between the front vehicle and the following vehicle and automatically activating the following vehicle braking system in a manner to slow or stop the following vehicle to maintain such preset distance thus preventing a collision between the vehicles.

Still a further feature of the present invention provides a vehicle collision prevention device which is relatively inexpensive to manufacture and maintain due to its simplicity of construction.

Yet still a further feature of the present invention provides a vehicle collision prevention device which is possessed of few parts and which therefore is unlikely to get out of order; one which is easy to use and reliable and efficient in operation; one which may, in its entirety, be manufactured and installed as part of the original equipment of the vehicle, or which may be attached to the vehicle later as an accessory item; and one which, otherwise, is well adapted to perform the services required of it.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a side elevational view of a front vehicle and a following vehicle having a vehicle collision prevention device mounted on the dashboard behind the windshield of the following vehicle;

FIG. 2 is a block diagram generally illustrating the components of the present invention;

FIG. 3 is a side elevational view of the vehicle brake pedal as connected to the dual acting hydraulic cylinder of the present invention and showing the invention mounted on the vehicle dashboard; and FIG. 4 is a side elevational view of the device mounted on the vehicle dashboard immediately behind the vehicle windshield.

DESCRIPTION OF THE PREFERRED EMBODIMENT

Referring now to the drawings in detail there is illustrated a preferred form of a vehicle collision prevention device intended to prevent rear-end type collisions between a front vehicle 9 and a following vehicle 10, the following vehicle hence forth referred to as the protected vehicle 10, the device being generally designated in its entirety by the reference numeral 11.

The prevention device 11 is comprised of a rectangularly shaped hollow box-like housing 12 having a front surface 13 with a radar transmitting and receiving antenna 14 mounted inwardly of the housing behind the front surface thereof and adapted to project and receive electromagnetic radar waves in a direction forwardly of the housing, the transmitting direction being generally indicated by arrows 15 with the receiving direction of the waves returning to the antenna being generally designated by arrow 16. The housing is provided with a bottom surface 17 adapted to rest on a dashboard 18 of the protected vehicle 10 in a position immediately rearwardly of the vehicle windshield 19 with the front surface 13 facing forwardly of the vehicle so as to direct electromagnetic waves forwardly of the vehicle in a direction to strike and be reflected from the front vehicle 9.

Disposed in the device 11 is a radar unit 21 which porjects and receives the waves 15 and 16 and provides an output voltage signal 22 which is proportional to the distance between the vehicle 9 and 10, the output signal being fed into a distance integrator 23 which also receives an output signal 24 from a preset distance control 25 which is mounted in the housing 12 and provided with a manually settable knob 26 having a pointer 27 thereon which is rotatable to indicate a selected distance indica 28 disposed about the knob such that the vehicle driver may preset the desired distance at which the vehicle driver wishes to follow the front car 9. The distance integrator 23 compares the input signals 22 and 24 and produces a difference voltage output signal 29 which is directed into a difference integrator circuit 30.

A conventional type electrical tachometer generator 31 is attached to the speedometer cable of the protected vehicle 10 in a manner to generate an electrical voltage output signal 32 which is always proportional to the speed at the time of the protected vehicle 10, the output signal 32 being fed into the difference integrator circuit 30.

The difference integrator circuit 30 compares the signals 29 and 32 and then provides an output signal proportional thereto in a manner to either apply or release the braking system of the protected vehicle 10 in a manner to slow or stop the vehicle 10 to maintain the preset distance from the front vehicle 9. This control of the vehicle braking system is provided by a pair of electrically operated hydraulic pumps 33 and 34 each having respective conduct outputs 35 and 36 connected to a dual acting hydraulic cylinder 37 having a piston 38 disposed centrally thereof and projecting out of one end thereof for reciprocal axial movement into and out of the cylinder, hydraulic pump 33 effecting the inward movement of the piston relative to the cylinder with hydraulic pump 34 effecting the outward movement of the piston relative to the cylinder. The hydraulic pumps 33 and 34 are each connected to the difference integrator circuit 30 in a manner to be selectively electrically energized through connections 41 and 42 respectively under the control of the integrator circuit.

The end of the cylinder opposite piston 38 is provided with a rod 43 which is pivotally attached by pivot pin 44 to a bracket 45 mounted to the dashboard 18. The projecting free end of the piston 38 is connected by pivot pin 46 to the foot brake lever 47 of the vehicle brake system which is provided with a foot receiving brake pad 48 at one end thereof and which has its opposite end 49 connected by suitable linkage 50 to operate the brakes of the vehicle. The brake lever 47 is connected by pivot pin 51 in a conventional manner to a support bracket 52 about which the brake lever pivotally operates in a manner to apply and release the vehicle brakes.

Electrical power from the vehicle battery is provided to the components of the device 11 in housing 12 by suitable electrical wiring 53. It is to be understood that interposed in said wiring is a suitable on-off switch for selectively controlling the electrical energization and de-energization of the prevention device 11.

In operation, a vehicle driver presets the distance control 25 by use of knob 26 to a desired distance behind which the vehicle driver wishes to follow the car in front of the protected vehicle, at which time the radar unit 21 operates in the conventional manner to detect the presence of the front vehicle and to provide an output signal 22 proportional to the distance behind the front vehicle and the protected vehicle, this output signal being compared by the distance integrator circuit 23 with the output signal 24 from the preset distance control 25 such that a difference output signal 29 is provided from the distance integrator circuit into the difference integrator circuit 30 wherein such signal is compared with the output signal 32 from the protected vehicle tachometer generator 31, the difference integrator determining which of the hydraulic pumps 33 and 34 to activate in a manner to apply or release the braking system of the protected vehicle 10. It is to be understood that since cylinder 37 is of the dual acting type that the output of the difference integrator will operate the hydraulic pumps in a manner to slow the vehicle to maintain not less than the preset distance between such vehicles, the pressure on the brake system by the cylinder 37 being proportional to the amount of force required to slow or brake the vehicle in order to maintain such preset distance and prevent rear-end type collisions between the front vehicle 9 and the protected vehicle 10.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A vehicle collision prevention device intended to be mounted in a vehicle in a position having a clear line of vision forwardly of the vehicle to detect the presence of a vehicle in front of the protected vehicle and behind which the protected vehicle is to travel, the device comprising a hollow box-like housing including a front surface and a bottom surface, a radar transmitting and receiving antenna mounted in said housing immediately behind said front surface and adapted to transmit electromagnetic radar waves in a direction forwardly of the vehicle and to receive any such waves which strike the forward vehicle and are bounced rearwardly therefrom, a radar unit connected to said antenna and providing an electrical voltage output signal proportional to the distance between said forward vehicle and said protected vehicle, a distance control manually settable by the vehicle driver to a desired distance at which the vehicle driver wishes to follow the front vehicle, the preset distance control providing an output voltage signal indicative of the preset distance selected by the vehicle driver, a distance integrator circuit receiving said radar unit output signal and said preset distance control output signal in a manner to compare the same and provide a proportional comparative output voltage signal, a difference integrator circuit, said comparative output signal from said distance integrator being fed into said difference integrator circuit, an electrical generator tachometer adapted to be connected to a speedometer cable of said protected vehicle for generating an electrical voltage indicative of the speed of the vehicle at all times, said tachometer generator signal being fed into said difference integrator circuit, means for applying the braking system of the protected vehicle, and said difference integrator providing output signals proportional to the difference between the tachometer generator signal and the distance integrator comparative output signal to operate said means in a manner to selectively apply and release the brake system of the vehicle whereby said vehicle may be slowed to automatically follow the forward vehicle at the selected preset distance.

2. The vehicle collision prevention device as set forth in claim 1 wherein said means for operating the vehicle braking system comprises a pair of separate electric hydraulic pumps each being electrically connected to said difference integrator circuit for electrical energization selectively thereby, a dual acting hydraulic cylinder having a front input connected to said first hydraulic pump and a back input connected to said second electric hydraulic pump, a piston disposed in said cylinder and projecting axially from one end thereof, said piston movable inwardly of said cylinder upon actuation of said first hydraulic pump with said piston being movable outwardly of said cylinder upon actuation of said second hydraulic pump, said cylinder adapted to be mounted in said protected vehicle with said projecting free end of said piston connected to a portion of the brake linkage system of said vehicle braking system in a manner to apply and release the vehicle brakes in accordance with the actuation of said first and said second hydraulic pumps.

3. The vehicle collision prevention device as set forth in claim 2 wherein said housing bottom surface is adapted to be mounted on a portion of a vehicle dashboard immediately rearwardly of the vehicle windshield providing a clear line of sight vision forwardly of the vehicle.

* * * * *